United States Patent
Gupta et al.

(10) Patent No.: US 7,562,095 B2
(45) Date of Patent: Jul. 14, 2009

(54) APPLICATION PROGRAMMING INTERFACES FOR AN ON-DEMAND PROPERTY SYSTEM

(75) Inventors: Namita Gupta, Seattle, WA (US); Mark J. Finocchio, Redmond, WA (US); Michael J. Hillberg, Beaux Arts, WA (US); Jeffrey L. Bogdan, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 377 days.

(21) Appl. No.: 11/036,967

(22) Filed: Jan. 14, 2005

(65) Prior Publication Data

US 2005/0165830 A1   Jul. 28, 2005

Related U.S. Application Data

(63) Continuation of application No. 10/939,296, filed on Sep. 11, 2004, which is a continuation-in-part of application No. 10/187,012, filed on Jun. 28, 2002, now Pat. No. 7,055,132, and a continuation-in-part of application No. 10/186,985, filed on Jun. 28, 2002, now Pat. No. 6,986,123.

(51) Int. Cl.
    *G06F 17/00* (2006.01)
    *G06F 7/00* (2006.01)
    *G06F 9/44* (2006.01)
(52) U.S. Cl. .................. 707/103 R; 717/111; 717/120
(58) Field of Classification Search .................. None
    See application file for complete search history.

(56) References Cited

U.S. PATENT DOCUMENTS

| | | | |
|---|---|---|---|
| 4,215,402 A | | 7/1980 | Mitchell et al. |
| 5,475,851 A | * | 12/1995 | Kodosky et al. ............ 715/763 |
| 5,668,998 A | * | 9/1997 | Mason et al. ............... 717/104 |
| 5,956,736 A | * | 9/1999 | Hanson et al. .............. 715/234 |
| 6,363,386 B1 | | 3/2002 | Soderberg et al. |
| 2003/0046673 A1 | | 3/2003 | Copeland et al. |
| 2003/0208493 A1 | | 11/2003 | Hall et al. |

FOREIGN PATENT DOCUMENTS

JP          11120060 A       4/1999

OTHER PUBLICATIONS

Page 24 from Chapter 6 of the Second Edition Java Language Specification archived on Nov. 9, 2000: http://web.archive.org/web/20001109040400/http://java.sun.com/docs/books/jls/second_edition/html/names.doc.html.*

(Continued)

*Primary Examiner*—Charles Rones
*Assistant Examiner*—Harold A Hotelling
(74) *Attorney, Agent, or Firm*—Lee & Hayes, PLLC

(57) ABSTRACT

The application programming interfaces described herein are directed at property management mechanisms that operate within an on-demand property system. The property management mechanisms support the caching of property values on an as needed basis, allow a plurality of object instances to utilize the same property via attached properties, overriding default information associated with a property on a per type basis, obtaining values for a property from an external source, and the like. In addition, the on-demand property system provides validation and control for each property instance. The property management mechanisms minimize the storage requirements and provide flexibility without requiring additional code from the developers.

20 Claims, 12 Drawing Sheets

OTHER PUBLICATIONS

ANSI, "American National Standard for Information Systems—Database Language-SQL", approved Oct. 16, 1992, 626 pages.

Chapter 6 ("Names") of Java Language Specification, retrieved on Oct. 3, 2006 at <<http://web.archive.org/web/20001109040400/http://java.sun.com/docs/books/jls/second_edition/html/names.doc.html>>, Nov. 9, 2000, pp. 1.

"Converting C Programs to the Java Programming Languages", retrieved on Oct. 4, 2006, at <<http://web.archive.org/web/20031219133101/http://java.sun.com/developer/JDCTechTips/2001/tt1009.html>>, Sun Microsystems Inc., Oct. 9, 2001, pp. 10.

McLaughlin, "Why Data Binding Matters", retrieved on Oct. 5, 2006 at <<http://web.archive.org/web/20020604004805/http://www.onjava.com/pub/a/onjava/2002/05/15/databind.html>>, O'Reilly & Associates, Inc., 2000, May 15, 2002, pp. 5.

Reilly, "Introducing the Singleton", retrieved on Oct. 3, 2006 at <<http:web.archive.org/web/20011211135633/http://javacoffeebreak.com/articles/designpatterns/>>, David Reilly, 1998, 1999, 2000, Jun. 2, 2001, pp. 4.

* cited by examiner

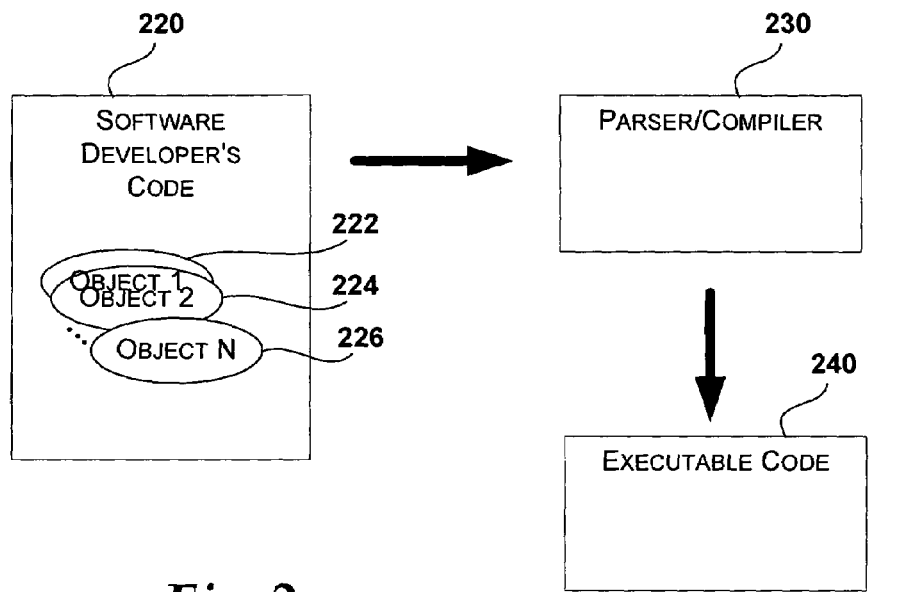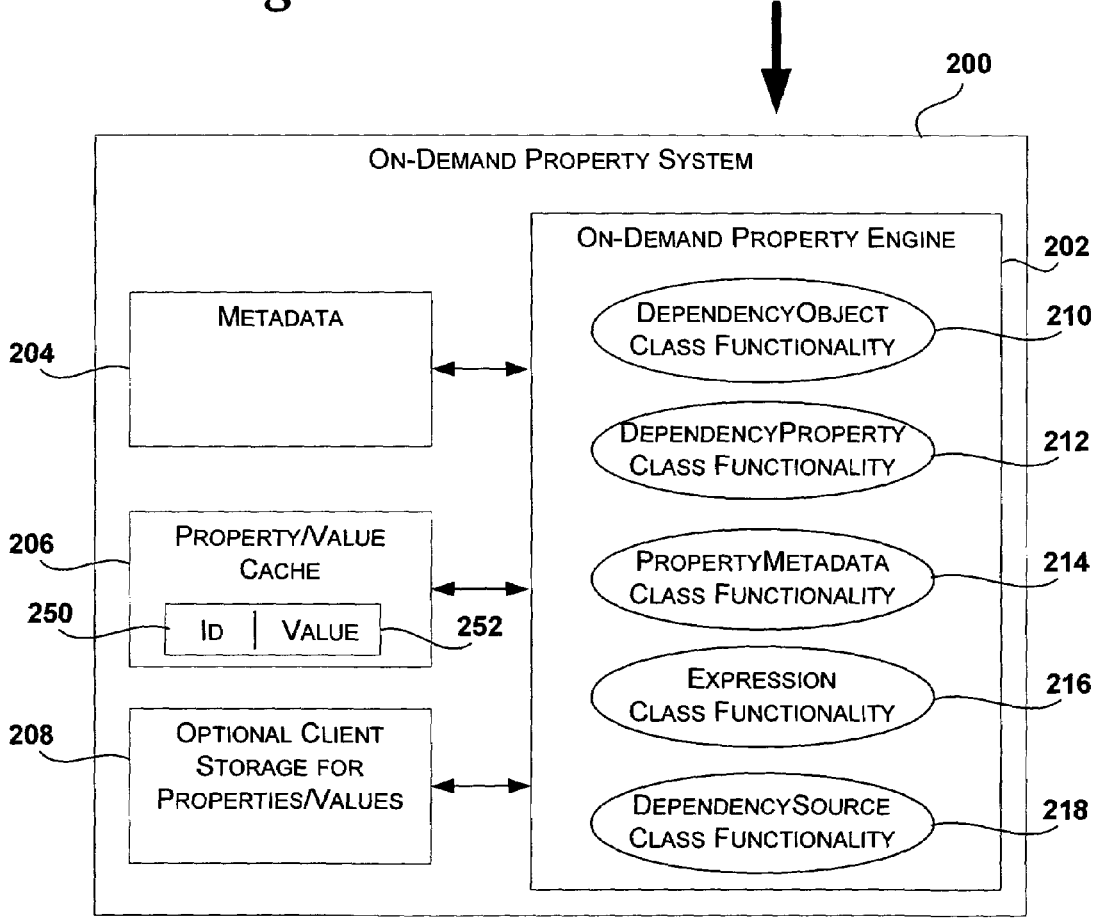
Fig. 2

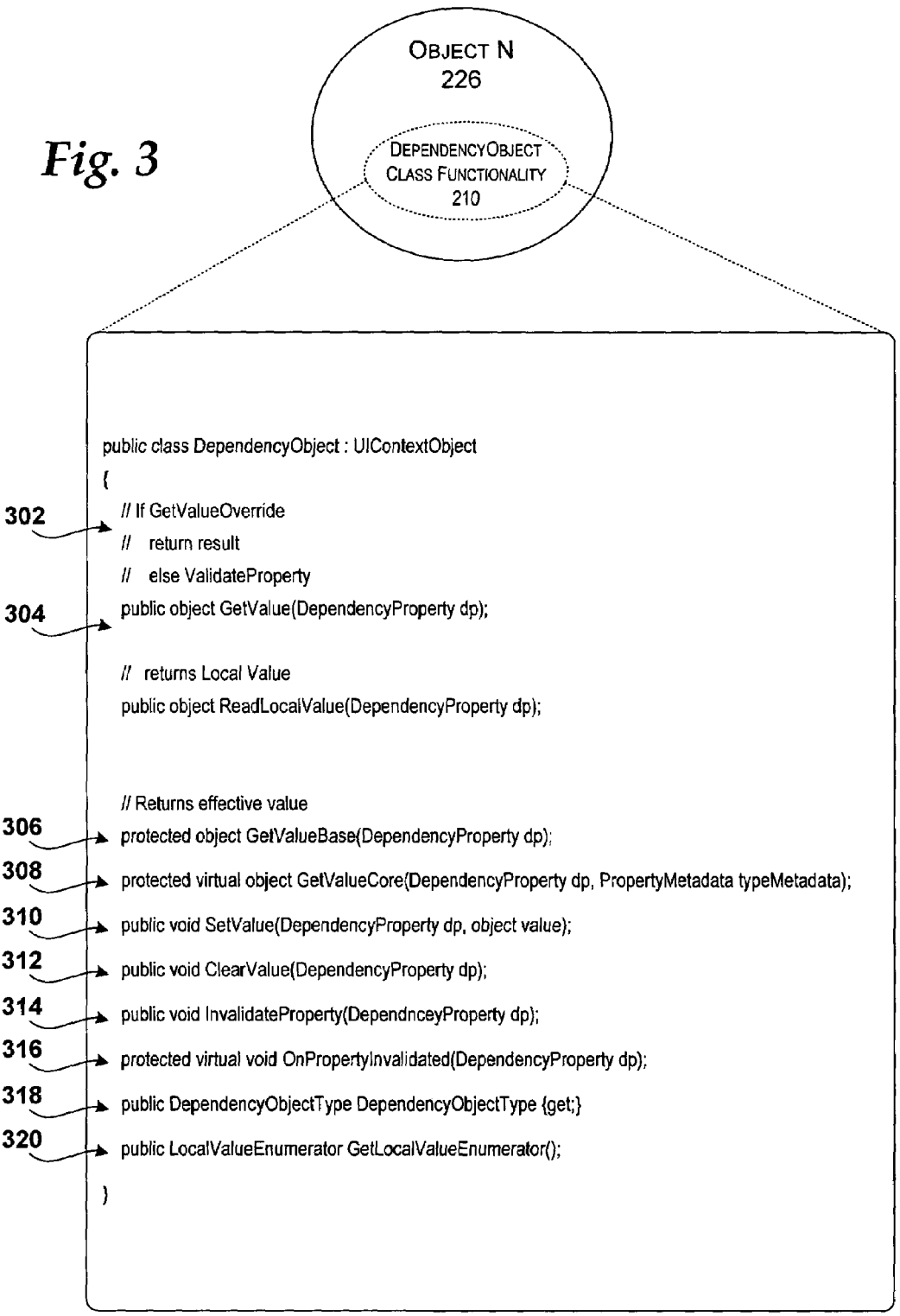

*Fig. 4*

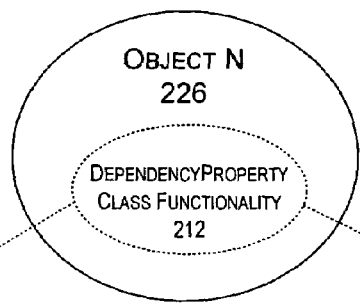

```
public class DependencyProperty
{
    // Methods
```
402 → `public static DependencyProperty Register(string name, Type propertyType, Type ownerType);`

404 → `public static DependencyProperty Register(string name, Type propertyType, Type ownerType, PropertyMetadata metadata);`

406 → `public DependencyProperty AddOwner(Type ownerType);`

408 → `public void OverrideMetadata(Type forType, PropertyMetadata typeMetadata);`

410 → `public PropertyMetadata GetMetadata(Type forType);`
412 → `public PropertyMetadata GetMetadata(DependencyObject d);`

//Name of the property
414 → `public string Name {get;}`

//Unique identifier for the framework
416 → `public Type OwnerType {get;}`

//Zero-based globally unique index of the property
418 → `public int GlobalIndex {get;}  // Auto-assigned`

//Type of property
420 → `public Type PropertyType {get;}`

//Used to determine if given value is appropriate for the type of the property
422 → `public bool IsValidType (object value);`
`}`

*Fig. 5*

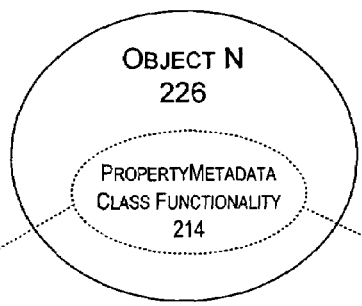

OBJECT N
226

PROPERTYMETADATA
CLASS FUNCTIONALITY
214

```
public class PropertyMetadata
{

//constructors
502 →  public PropertyMetadata(object DefaultValue);
504 →  public PropertyMetadata(object defaultValue, bool ReadOnly);
506 →  public PropertyMetadata(PropertyInvalidatedCallback propertyInvalidatedCallback);
508 →  public PropertyMetadata(PropertyInvalidatedCallback propertyInvalidatedCallback,
             GetValueOverride GetValueOverride);

//default value
510 →  public Object DefaultValue{get;set;}

//Callback for property invalidations
512 →  public PropertyInvalidatedCallback PropertyInvalidatedCallback{get;set;}

//Callback for get value
514 →  public GetValueOverride GetValueOverride{get;set;}

//Disables SetValue
516 →  public bool ReadOnly {get;set;}

//Determines if the metadata has been applied to a property resulting in the sealing (immutability) of the
    instance so that the Framework can throw an exception if someone tries to change it.
518 →  protected bool IsSealed{get;}

//Enable merge of the source metadata with self
    protected virtual void Merge(PropertyMetadata source);
}
```

1200

```
public class Mercury : DependencyObject
{
    static Mercury()
    {
        DeltaProperty.AddOwner( typeof(Mercury));
        // Delta is cache optimized (follows cache pattern)
        DeltaProperty.OverrideMetadata(typeof(Mercury), new PropertyMetadata(3.14,
                    new PropertyInvalidatedCallback(OnDeltaPropertyInvalidated),
                    new GetValueOverride (DeltaGetValueOverride)));
    }
    private static void OnDeltaPropertyInvalidated(DependencyObject d)
    {
        // Mark cache as invalid
        ((Mercury)d)._deltaValid = false;
    }
    private static object DeltaGetValueOverride (DependencyObject d)
    {
        // Call caching get accessor
        return ((Mercury)d).Delta;
    }
    public double Delta
    {
        get
        {
            // Cache pattern to cache computed results from GetValue
            if (!_deltaValid)
            {
                _delta= (double) GetValueBase (GreekStandard.DeltaProperty);
                _deltaValid = true;
            }
            return _delta;
        }
        set { SetValue(GreekStandard.DeltaProperty, value); }
    }
    // Type-safe, non-boxed (requires additional dirty bit)
    private double _delta;
    private bool _deltaValid;
}
```

*Fig. 12*

APPLICATION PROGRAMMING INTERFACES FOR AN ON-DEMAND PROPERTY SYSTEM

This application is a Continuation of prior application Ser. No. 10/939,296, filed Sep. 11, 2004, which is a Continuation-in-Part of prior applications Ser. No. 10/187,012, filed Jun. 28, 2002, and Ser. No. 10/186,985, filed Jun. 28, 2002, which are both hereby expressly incorporated by reference for all purposes.

TECHNICAL FIELD

This document generally relates to mechanisms for handling properties of objects, and more particularly, to mechanisms for managing properties and their associated values in an on-demand property system.

BACKGROUND

Today, most applications are written using objects. These objects may be supplied by third parties or may be developed specifically for an application. By using objects, code may be easily reused and incorporated into many different applications without modification. In addition, if modifications are necessary, a new object may be created that inherits the functionality of the object. Then, new specific functionality may be added to the new object as needed. This ability to reuse and modify existing objects reduces the development time for new applications, sometimes as much as from months to weeks.

However, even though the use of objects has become very commonplace and is beneficial, the current approach for handling properties in these objects has several drawbacks. For example, if a first property in an object is dependent on a second property in another object, a developer must write code that monitors (i.e., listens) to the second property and, upon change, change the first property. One simplified portion of code that performs these functions is as follows:

```
void Button1_OnPressedChanged(bool NewValue)
{
    if (newValue == true)
    {
        BackgroundColor = Color.Red;
    }
    else
    {
        BackgroundColor = Color.Grey;
    }
).
```

As shown, this callback function returns a value for the second property (i.e., BackgroundColor), whenever the first property (e.g., Button1 Pressed) changes. Therefore, each time the first property state changes, a value (e.g., Red or Grey) is computed and stored in the second property during the callback. This technique requires storage in the object for the second property. The storage is used to keep a current state for the second property.

Because developers may develop these objects in isolation, circularities between some of the properties within different objects may occur. For example, continuing with the above example, a callback function for the backgroundColor property may be added that changes the state of the Button1 Pressed property. While having a callback function that changes the state of a button pressed property due to a change in backgroundColor is not very realistic and would not typically occur in an application, it helps illustrate the problem that occurs when two properties change each other's state. In actual applications, typically, two parameter would not change each other's state directly, but other dependent properties would cause the circularity illustrated by this simplistic example. Therefore, given the example above, at runtime, once one of these two properties changes state, both will continue to change states indefinitely. This circularity problem must then be identified and corrected before proper operation can occur. Unfortunately, it is very difficult to test every combination of property changes. Therefore, some of these circularity problems may not surface until after a software product has been released.

Due to at least these limitations, the current model for handling properties of objects is not ideal.

SUMMARY

The invention is directed at property management mechanisms described herein operate within an on-demand property system. The property management mechanisms support the caching of property values on an as needed basis, allow a plurality of object instances to utilize the same property via attached properties, overriding default information associated with a property on a per type basis, obtaining values for a property from an external source, and the like. In addition, the on-demand property system provides validation and control for each property instance. The property management mechanisms minimize the storage requirements and provide flexibility without requiring additional code from the developers.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 2 is a functional block diagram generally illustrating an overview of components for one embodiment of an on-demand property system in which the present property management mechanisms may operate.

FIG. 3 is a graphical representation of a DependencyObject class shown in FIG. 2 that provides functionality associated with the property management mechanisms.

FIG. 4 is a graphical representation of a DependencyProperty class shown in FIG. 2 that provides functionality associated with the property management mechanisms.

FIG. 5 is a graphical representation of a PropertyMetadata class shown in FIG. 2 that provides functionality associated with the property management mechanisms.

FIG. 12 is an illustrative embodiment 1200 for implementing a portion of the present property management mechanisms.

DETAILED DESCRIPTION

Briefly, the present property management mechanisms operate within an on-demand property system. The property management mechanisms support the caching of property values on an as needed basis, allow a plurality of object instances to utilize the same property via attached properties, overriding default information associated with a property on a per type basis, obtaining values for a property from an external source, and the like. In addition, the on-demand property system provides validation and control for each property instance. The property management mechanisms minimize the storage requirements and provide flexibility without requiring additional code from the developers. These and other advantages will become clear after a careful reading of the following detailed description.

The following detailed description is divided into several sections. A first section describes an illustrative computing system in which the present property management mechanisms may operate. A second section describes an exemplary implementation of the property management mechanism within an on-demand property system. A third section describes the property management mechanisms within the on-demand property system. A fourth section describes a generalized operation of the property management mechanisms.

Illustrative Computing Environment

Figure 1:
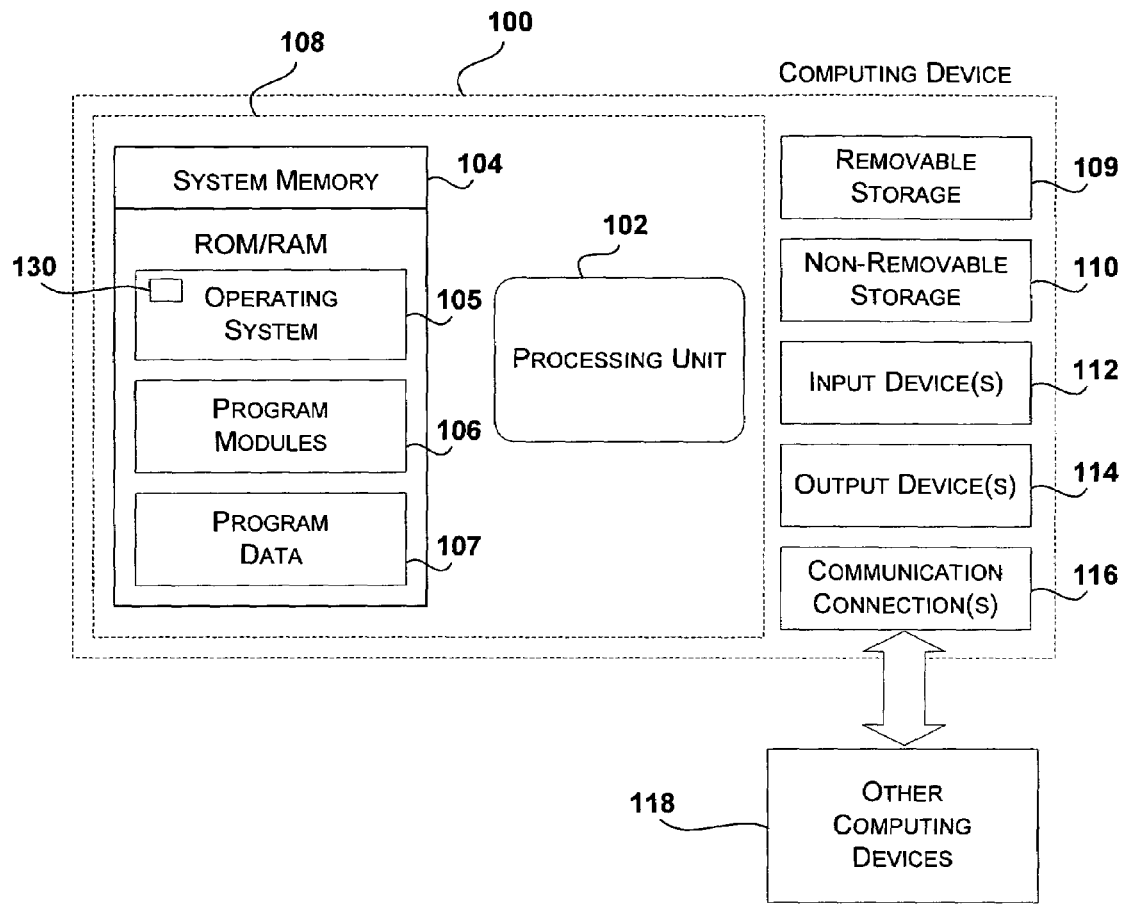
FIG. 1 is an illustrative computing device that may be used to implement the techniques and mechanisms described herein.

FIG. 1 illustrates one exemplary computing system for implementing the present property management mechanisms. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The system memory 104 may also include an on-demand property system 130 that interacts with the components of the operating system 105 to provide the present property management mechanisms (not shown). The on-demand property system 130 may reside as part of the operating system 105 (as shown) or may reside as part of the program modules 106. The program modules 106 may include one or more assemblies (not shown) that utilize the functionality of the on-demand property system 130 when executing. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Exemplary On-Demand Property System

FIG. 2 is a functional block diagram generally illustrating an overview of components for one embodiment of an on-demand property system 200 in which the present property management mechanisms 210-216 may operate. The on-demand property system 200 is preferably installed on a computing system, such as the computing device 100 described above. As an overview, one of the primary functions of the on-demand property system 200 is to provide mechanisms for computing a property's value based on other properties.

The on-demand property system 200 includes an on-demand property engine 202, metadata 204, and a property/value cache 206. Briefly, metadata 204 includes information about any state that is associated with an "attached" property, also referred to as a "dependency" property. In overview, an "attached" property refers to a property that may be shared with multiple instances of objects. At a conceptual level, "attached" properties may be compared to global variables that are used with traditional programming techniques. However, as will be described, "attached" properties are much more flexible and provide much more control over the property than global variables can provide. The mechanisms for "attaching" a property will be described in greater detail below. As will be described, attached properties are identified via a DependencyProperty and are read and written using GetValue and SetValue accessors. By attaching properties, one class may access properties of another class and store data on the properties for its own reference.

One implementation for which attached properties is very desirable is in user interface design and layout design. The layout design objects may attach some of the user interface properties in order to better determine the layout, and vice versa.

Metadata 204 may include a DataBindable indicator, an Inheritable indicator, a default value, and the like for each "attached" property. The property/value cache 206 represents a generic data structure in which identifiers (e.g., identifier 250) for the "attached" properties and their associated local values (e.g., value 252) are stored. In one embodiment, the property/value cache 206 may be a hash table.

The on-demand property system 200 may optionally provide client storage 208 for attached properties and their associated values. In certain situations, a client may want to supply their own local storage for properties. As will be described below, the property management mechanisms allow an external party to store and return local values from their own local storage.

The on-demand property engine 202 manages the metadata 204, the property/value cache 206 (i.e., dependency properties and their values), and the optional client storage 208. In overview, the goal of the on-demand property engine 202 is to perform work when necessary without performing work that is not necessary. This is in direct contrast with how traditional programming techniques maintained property values. For example, using traditional techniques, each property on every instance of every object is considered important. Therefore, validation and updating of every property is performed, even though some of the properties may never be retrieved. Thus, there is a lot of unnecessary processing performed to manage the properties using traditional programming techniques. However, using the current on-demand property engine, the important properties are those that are queried for a particular instance. Thus, the on-demand property engine performs work as needed (i.e., on-demand) for those properties that are queried.

In order to provide this on-demand work, the on-demand property engine 202 provides a DependencyObject class functionality 210, a DependencyProperty class functionality 212, a PropertyMetadata class functionality 214, an Expression class functionality 216, and a DependencySource class functionality 218.

In overview, the DependencyObject class functionality 210, illustrated in FIG. 3 and described later in conjunction therewith, provides attached property support, provides property invalidation notification services, provides dependency-based property value evaluations, and the like. In overview, the DependencyProperty class functionality 212, illustrated in FIG. 4 and described later in conjunction therewith, provides a property management mechanism for associating a dependency property with one or more objects and for specifying metadata for the dependency properties. Thus, the DependencyObject class is the base class for any class whose instances desire the ability for DependencyProperties to be applied on them. In one embodiment, any object may register a DependencyProperty. The DependencyProperty may be any property, even a native property. Further, any DependencyProperty registered by any object, may be applied to any subclass of DependencyObject. Therefore, DependencyProperties are useful to attach a property on any DependencyObject, to set value expressions like databinding to a property, to receive notifications of property invalidations, to determine inheritance, and the like. Each of these will be described in more detail below.

In overview, the PropertyMetadata class functionality 214, illustrated in FIG. 4 and described later in conjunction therewith, defines an attached property's behavior and metadata. As will be shown, a subclass of a DependencyObject may set the metadata for a particular DependencyProperty which determines the behavior of that DependencyProperty for that type. Therefore, different types may define different metadata for a particular DependencyProperty. For example, RepeatButtons may want to define their own default style which is different from the default style for a Button. Therefore, if Button defines a metadata for its own type, and RepeatButton overrides metadata, RepeatButton still inherits metadata from the button, but any new information provided will override the corresponding old information.

In overview, the Expression class functionality 216, illustrated in FIG. 10 and described later in conjunction therewith, allow an expression to be associated with a value of a property for an instance of a DependencyObject. Expressions define relationships between properties. For example, the value of the property may be defined as an expression which has logic for computing the value for that property. However, because the logic may utilize a target that is outside the knowledge of the on-demand property system 200, the DependencySource class functionality 218, illustrated in FIG. 11 and described later in conjunction therewith, is utilized with the Expression class functionality 216 to inform the on-demand property system 200 of the dependency of the DependencyProperty on the target DependencyProperty. The Expression class functionality 216 minimizes the logic that different frameworks need to implement in order to provide invalidations and expressions.

In operation, software developer's code 220 may include several instances of objects (e.g., objects 222-226). One or more of these objects 222-226 may subclass functionality provided by the on-demand property engine 202. The developer's code 220 is parsed or compiled, depending on the form of the developer's code. The parsing or compilation may be performed using a JIT compiler and the like. The result of parsing/compilation is executable code 240 that may be processed using the on-demand property system 200 in conjunction with other components of an operating system. As one skilled in the art will appreciate, the steps for obtaining the executable code is well known to those skilled in the art and modifications to the steps do not necessarily affect the operation of the on-demand property system 200 as long as the functionality provided by the on-demand property engine 202 has been successfully specified within the developer's code prior to generation of the executable code 240. Each of the functionalities for performing property management is now described in detail.

Property Management Mechanisms

FIG. 3 is a graphical representation of a DependencyObject class shown in FIG. 2 that provides functionality associated with the property management mechanisms. The DependencyObject class functionality 210 may include a number of properties (e.g., DependencyObjectType 318 and methods (e.g., SetValue( ) 310). A representative set of the properties and the methods are shown in FIG. 3.

The DependencyObject class includes a GetValue method 302 that takes a DependencyProperty as a parameter and returns an object. The GetValue method 302 is a public method that gets the value for the specified DependencyProperty. The GetValue method 302 may call GetValueOverride, explained later in conjunction with FIG. 5, to obtain the value. Thus, the value may be obtained in various ways, which may or may not include obtaining the value from the local value.

The DependencyObject class also includes a ReadLocalValue method 304 that takes a DependencyProperty as a parameter and returns an object. The ReadLocalValue method 304 is a public method that reads the local value of the specified DependencyProperty. As will be described later, a local value may not always be available. In these circumstances, the property engine attempts to utilize a default value, and, if a default value is not specified, the property engine may return "null".

The DependencyObject class also includes a GetValueBase method 306 that takes a DependencyProperty as a parameter and returns an object. The GetValueBase method 306 is a protected method that may be used by other methods within the DependencyObject class. GetValueBase method 306 may be called to compute a new value of an attached property. However, in contrast with GetValue, GetValueBase does not call the GetLocalValueOverride method.

The DependencyObject class also includes a GetValueCore virtual method 308 that takes a DependencyProperty and a PropertyMetadata as parameters and returns an object. Again, the GetValueCore method 308 is a protected method. Subclasses of DependencyObject may override this method in order to provide their own process for getting a value. For example, the subclass may override the method in order to reference a value of a property in a style instead of getting the value from the local store.

The DependencyObject class also includes a SetValue method 310 that takes a DependencyProperty and an object as parameters and returns void. The SetValue method 310 is a public method that sets the value of the specified DependencyProperty to the specified object. Typically a call to set( ) simply calls SetValue.

The DependencyObject class also includes a ClearValue method 312 that takes a DependencyProperty and returns void. The ClearValue method 312 is a public method that clears the local value for the specified DependencyProperty.

The DependencyObject class also includes a InvalidateProperty method 314 that takes a DependencyProperty and returns void. The InvalidateProperty method 314 is a public method that is called to invalidate the specified DependencyProperty on a DependencyObject. This invalidation of the specified DependencyProperty is performed whenever there has been some indication that the DependencyProperty may have changed. Therefore, in certain circumstances, the invalidation may occur without a change occurring on the specified DependencyProperty.

The DependencyObject class also includes an OnPropertyInvalidated callback 316 that takes a DependencyObject and returns void. The OnPropertyInvalidate callback 316 is a protected method. A subclass of a DependencyObject may override the OnPropertyInvalidated callback in order to perform unique processing for when the DependencyProperty get invalidated. In addition, a subclass may provide ValueChanged notifications that alert users of changes in the property value. In one embodiment, an event within the OnPropertyInvalidated callback is provided to implement these ValueChanged notifications.

The DependencyObject class also includes a DependencyObjectType property 318. The value for the DependencyObjectType is specified during registration of the DependencyObject.

The DependencyObject class may also include a GetLocalValueEnumerator method 320. The GetLocalValueEnumerator method 320 is a public method that returns a LocalValueEnumerator. The LocalValueEnumerator allows the enumeration over the local property values of the DependencyObject.

FIG. 4 is a graphical representation of a DependencyProperty class shown in FIG. 2 that provides functionality associated with the property management mechanisms. The DependencyProperty class functionality 212 may include a number of properties (e.g., Name 414) and methods (e.g., Register( ) 402). A representative set of the properties and the methods are shown in FIG. 4.

The DependencyProperty class includes a first Register method 402 that takes a string name, a property type, and ownerType as parameters and returns a DependencyProperty. The name identifies the specified property. The property type allows SetValue method 310 to be validated if available. The ownerType refers to the type of object which registered the specified property. The first Register method 402 is a public method that obtains the information necessary for storing the information in the property/value cache. The first Register method 402 may be used by any type registering a property for the first time. It is important to note that the DependencyProperty may only be registered once with the same set of parameters. However, the DependencyProperty that is registered with the Dependency System may be used on any DependencyObject or its derived types.

The DependencyProperty class also includes a second Register method 404 that is similar to first Register method 402, except that metadata is also provided as an argument. Upon registering the specified DependencyProperty, the supplied metadata becomes associated with the specified DependencyProperty. It is not desirable to provide type specific metadata in the register call, because the defaultMetadata in the register call is applicable when the property is used on any type. If a default value for an attached property is not defined in the default metadata or defined in the Type metadata, the property engine will return the following:

```
If (_propertyType.IsValueType)
{ // value-types have default-constructed type default values
    _defaultValue = Activator.CreateInstance(_propertyType);
}
else // Reference-types have 'null' default value
    _defaultValue = null;
}.
```

The DependencyProperty class also includes an AddOwner method 406 that takes a Type as a parameter and returns a DependencyProperty. The AddOwner method 406 is a public method that attaches the DependencyProperty to the calling Type.

The DependencyProperty class also includes an OverrideMetadata method 408 that takes a Type and a PropertyMetadata as parameters and returns void. The overrideMetadata method 408 is a public method that allows metadata associated with DependencyProperty to be overwritten. For example, the metadata of a base type may be modified as follows:

```
Public class Mercury : DependencyObject
{
    static Mercury( )
    {
        PropertyMetadata Metadata = new PropertyTypeMetadata( );
        Metadata.Defaultvalue = 3.14;
        DeltaProperty.OverrideMetadata(typeof(Mercury), Metadata);
    }
}.
```

In the Mercury class shown above, the constructor modified the defaultvalue. While this is possible, it is important to determine whether the above is beneficial and/or desirable for your code development.

The DependencyProperty class also includes two GetMetadata methods 410 and 412. One takes a Type as a parameter and the other takes a DependencyObect as the type. The GetMetadata methods are public.

The DependencyProperty class also includes several properties, such as a string Name 414 that identifies the DependencyProperty, an OwnerType 416 that uniquely identifies the framework, a GlobalIndex property 418 that provides a zero-based globally unique index of the property, and a PropertyType 420 that identifies the type of object registering the DependencyProperty.

DependencyProperty class also includes an IsValidType property 422 that is used to determine if a given value is appropriate for the type of the property.

FIG. 5 is a graphical representation of a PropertyMetadata class shown in FIG. 2 that provides functionality associated with the property management mechanisms. The PropertyMetadata class functionality 214 may include a number of properties (e.g., IsSealed 518) and constructors (e.g., constructors 502-508). A representative set of the properties and constructors are shown in FIG. 5.

The PropertyMetadata class includes a first constructor 502 that takes an object as a defaultValue. The defaultValue then becomes associated with the designated DependencyProperty. The PropertyMetadata class also includes a second constructor that, in addition to the defaultValue, takes a Boolean ReadOnly parameter 516.

The Property Metadata class also includes a third constructor that takes a property invalidated call back. The property invalidated call back is called when the DependencyProperty is invalidated. The property Metadata class also includes a fourth constructor, which in addition to the property invalidated call back, takes a GetValueOverride callback 514 as a parameter.

The Property Metadata class also includes a DefaultValue property 510, a ReadOnly property 516, and an IsSealed property 518. The DefaultValue property supplying a value for the DependencyProperty in the case where no other value is available. The ReadOnly property 516 providing a means for disabling the operation of the SetValue method, thereby making the DependencyProperty read only.

Figure 6:
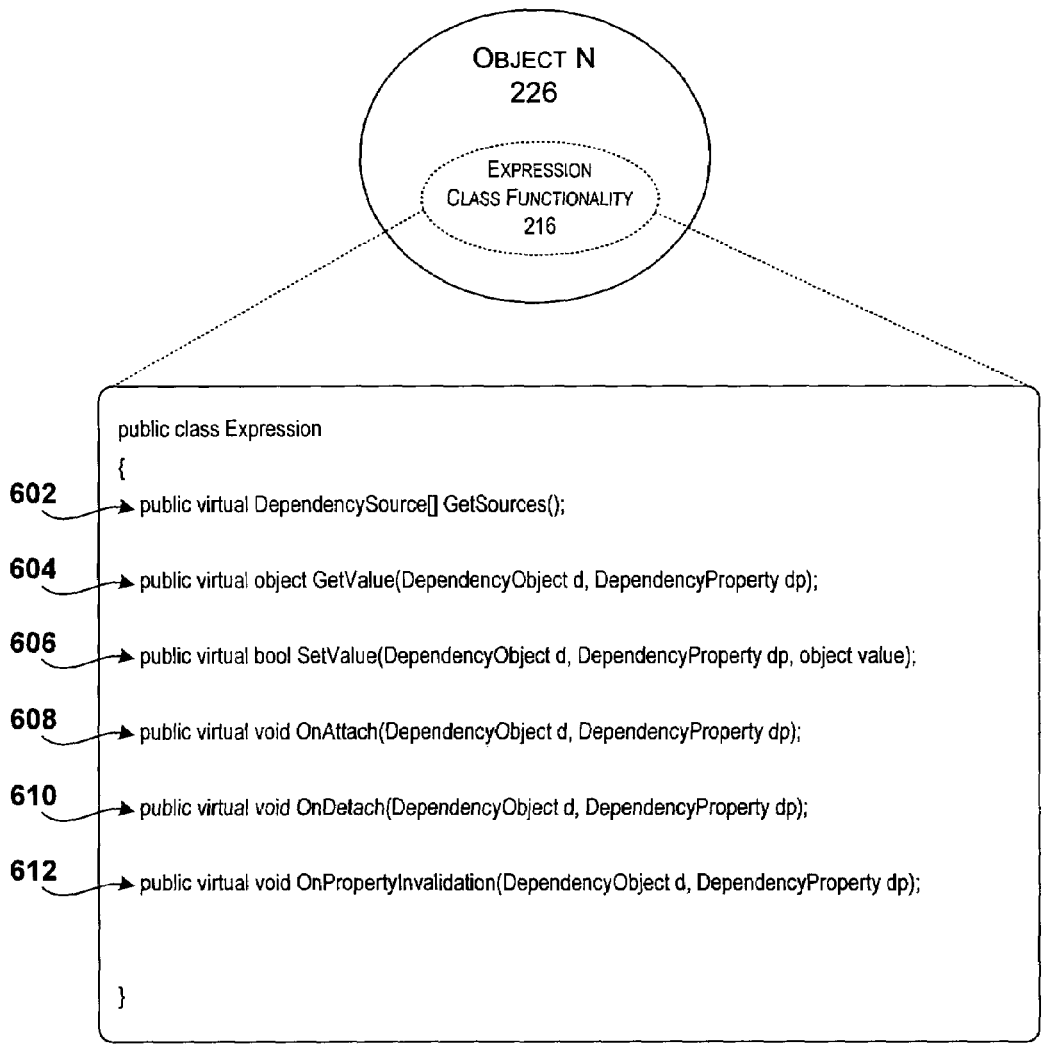
FIG. 6 is a graphical representation of an Expression class shown in FIG. 2 that provides functionality associated with the property management mechanisms.

FIG. 6 is a graphical representation of an Expression class shown in FIG. 2 that provides functionality associated with the property management mechanisms. The Expression class functionality 216 may include a number of properties (e.g., DependencySource 602) and methods (e.g., GetValue( ) 604). A representative set of the properties and the methods are shown in FIG. 6.

The Expression class includes an array of DependencySource properties 602. The dependency sources represent the source for the data. Therefore, the expression provides the sources. A notification to the expression instance may then occur whenever a source is updated. In other words, if an expression is placed on a DependencyObject/DependencyProperty, the sources of the expressions are given back-pointers.

The Expression class also includes a GetValue method 604 that takes a Dependency Object and a DependencyProperty as parameters and returns a object. The GetValue method 604 defines how to evaluate the value of the expression for a given DependencyObject and DependencyProperty.

The Expression class also includes a SetValue method 606 that takes a Dependency Object, a DependencyProperty, and an object as parameters and returns a bool. In general, the expression class provides a means for defining relationships between properties. The SetValue method 606 defines the manner in which the value specified in the object parameter is set for a given DependencyObject and DependencyProperty. In other words, the SetValue method 606 is used to apply the Expression to the property on the instance. With this SetValue method 606, two-way databinding is available. The bool return value is used to notify the DependencyObject that the Expression has handled the set (i.e., storage) of the value. If the bool return value is true, then, the Expression invalidates the property of interest.

The Expression class also includes an OnAttach method 608 that takes a DependencyObject and a DependencyProperty as parameters and returns nothing. The OnAttach method 608 is called when an expression is being associated with a DependencyProperty for a particular DependencyObject. This enables the Expression to invalidate a particular DependencyProperty on a particular DependencyObject, if one of the DependencySources has been invalidated.

The Expression class also includes an OnDetach method 610 that takes a DependencyObject and a DependencyProperty as parameters. The OnDetach method 610 is called when an expression is b eing detached from a Dependencyproperty for a particular DependencyObject. This enables the Expression to release any resources associated with the DependencyObject and the DependencyProperty.

The Expression class also includes an OnPropertyInvalidation method 612 that takes a DependencyProperty and DependencyObject as parameters. The OnPropertyInvalidation method is called when a property on which the expression is applied is invalidated. For expressions that propogate value updates to the dependency sourc, this OnPropertyInvalidation method 612 needs to be called so that changes may be notified.

Figure 7:
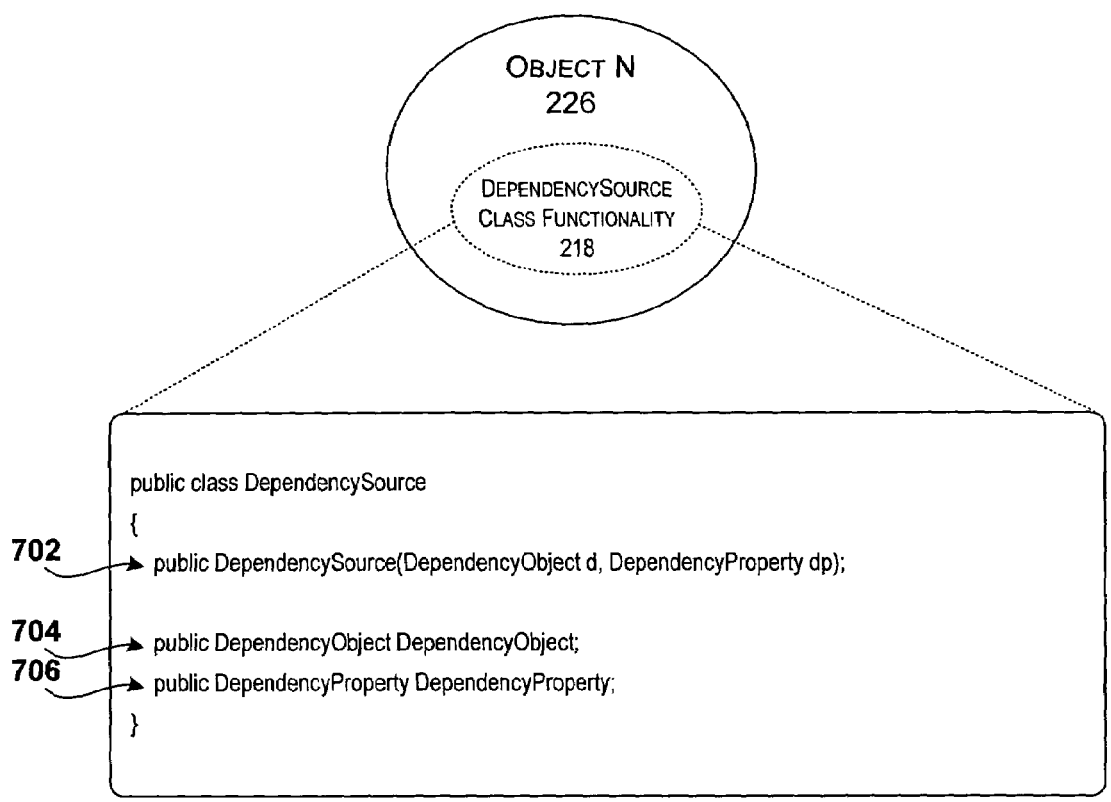
FIG. 7 is a graphical representation of a Dependency-Source class shown in FIG. 2 that provides functionality associated with the property management mechanisms.

FIG. 7 is a graphical representation of a DependencySource class shown in FIG. 2 that provides functionality associated with the property management mechanisms. The DependencySource class functionality 216 may include a number of properties (e.g., DependencyObject 704) and a constructor (e.g., DependencySource constructor 702). A representative set of the properties and the constructors are shown in FIG. 7.

The DependencySource class includes a constructor 702. The constructor takes a DependencyObject and a DependencyProperty as arguments. The values for the DependencyObject and DependencyProperty are stored in the DependencyObject property 704 and the DependencyProperty 706.

Generalized Operation of the Property Management Mechanisms

Figure 8:
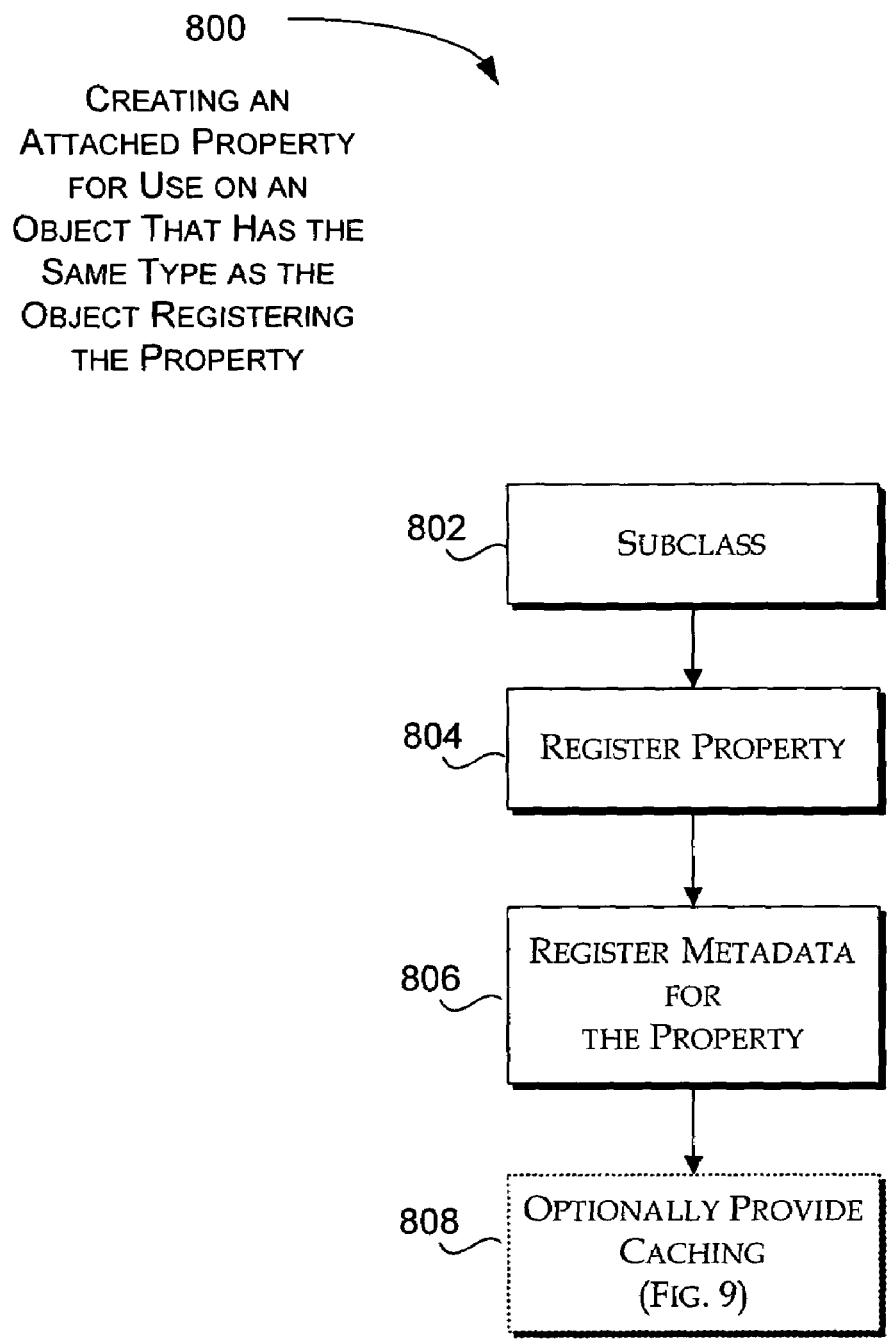
FIG. 8 is a process for creating an attached property for use on an object having the same type as the object registering the property.

FIG. 8 is a process for creating an attached property for use on an object that has the same type as the object registering the property. At block 802, the object subclasses the DependencyObject in order to obtain the property management mechanisms of interest. At block 804, the property of interest is registered using one of the register APIs discussed above. As explained above, default metadata for the property of interest may be provided in the registration call. However, the metadata should not provide default metadata that is undesirable for other types of objects. At block 806, metadata for the property of interest may be registered. This may be performed using the RegisterTypeMetadata API described above. At block 808, caching for the property of interest may be provided. Typically, caching, illustrated in FIG. 9 and described below, is provided to ensure optimized access to the property of interest. If a Type is aware of possible use of dependency properties on themselves, the Type may want to provide optimized caching for the dependency properties on themselves. Processing is then complete.

Figure 9:
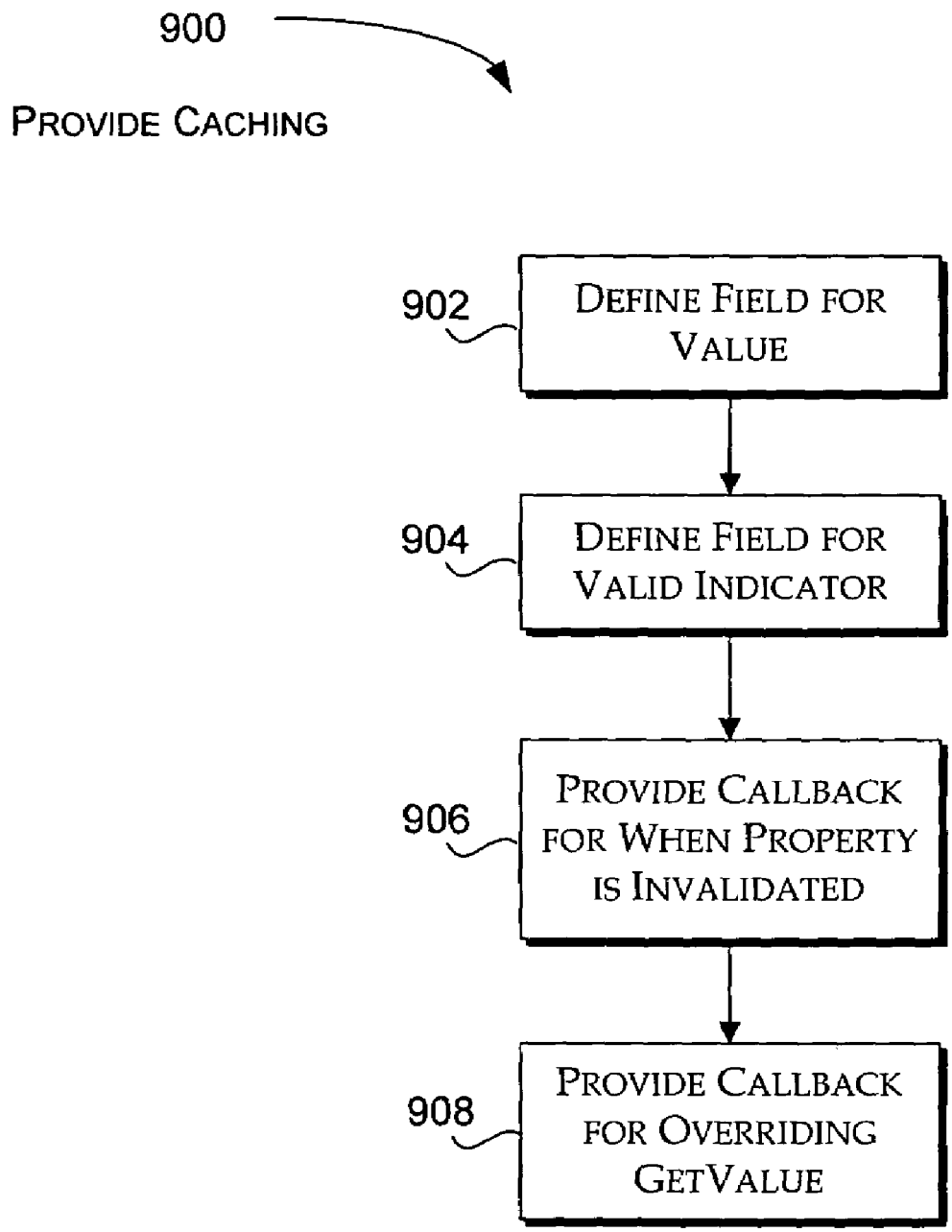
FIG. 9 is a process for providing caching of the attached property that may optionally be performed when creating the attached property illustrated in FIG. 8.

FIG. 9 is a process for providing caching of the attached property that may optionally be performed when creating the attached property illustrated in FIG. 8. At block 902, a field for the value is defined. At block 904, a field for a valid indicator is defined. At block 906, a PropertyInvalidated callback is provided during registration. Thus, when the property of interest changes or one of its dependencies changes that may affect the value for the property of interest, the propertyInvalidated callback is called. When the propertyInvalidated callback is called, the valid indicator is set to indicate that the value for the property of interest is dirty. At block 908, a GetValueOverride callback is provided during registration. Thus, when the property of interest is queried, as long as the valid indicator does not indicate a dirty value, the local value is obtained in response to the query. Only if the valid indicator indicates that the value is dirty does the property engine attempt to determine a value for the property of interest by looking up in a hierarchy, such as in a local value, style sheet, inheritance, and a default value. The look up is further influenced by metadata associated with the property of interest. For example, if the inherit indicator for the property of interest and each of its parents is true, the property engine will walk up its parent chain. However, if the property of interest or one of its parents has the inherit indicator set to false, the property engine will stop walking up the parent chain at that point. Likewise, the databindable indicator may be set for databindable or non-databindable. The property engine adjusts its processing accordingly. Thus, these mechanisms control the determination of the value for the property of interest and make the query more efficient.

Figure 10:
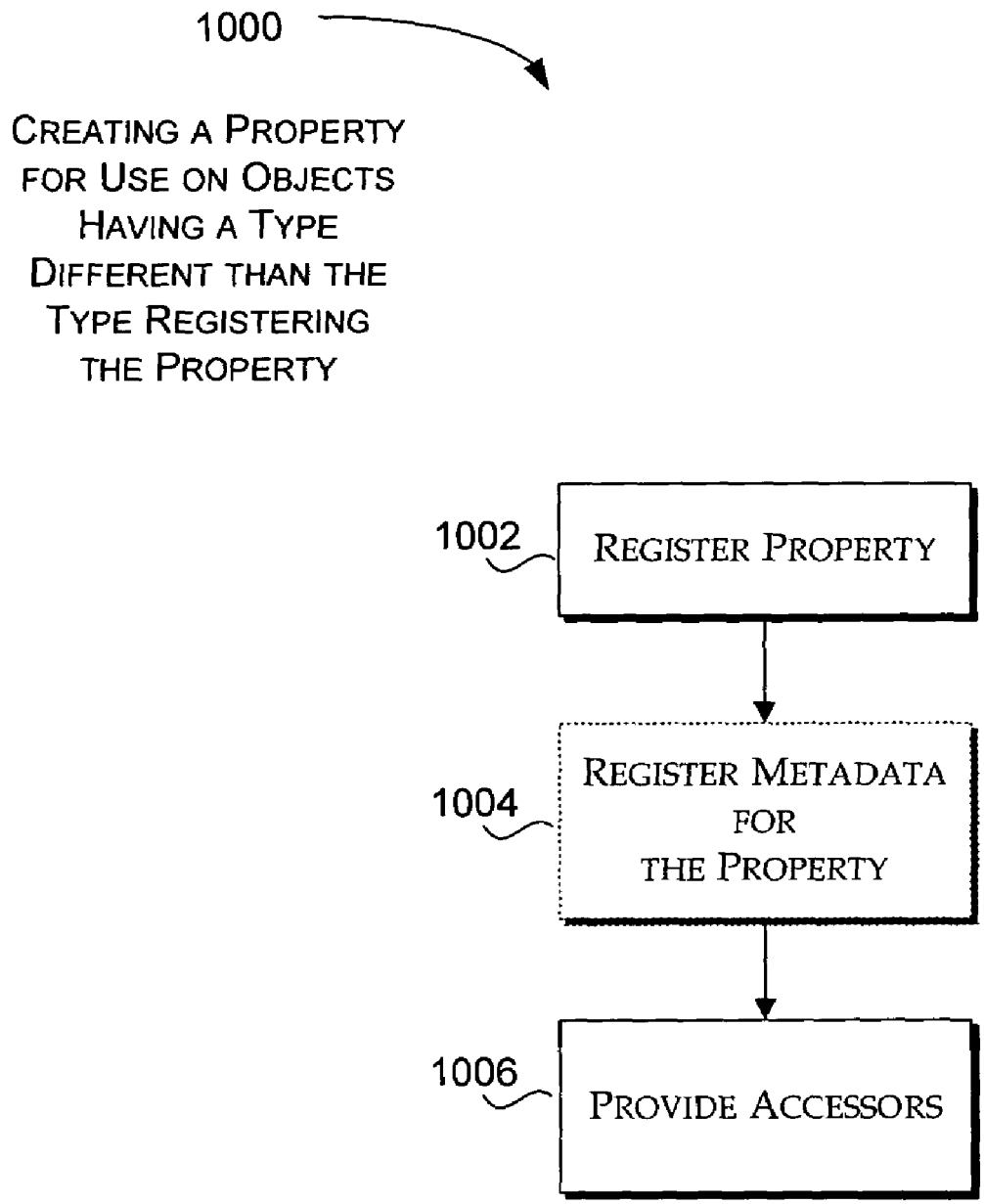
FIG. 10 is a process for creating an attached property for use on an object having a different type than the object registering the attached property.

FIG. 10 is a process for creating an attached property for use on an object having a different type than the object registering the attached property. It is important to note that for process 1000, the object performing the registration for the attached property does not need to subclass the DependencyObject class. At block 1002, the property of interest is registered using one of the registration APIs discussed above. At block 1004, metadata may optionally be included when registering the property of interest. At block 1006, accessors (e.g., Set and Get) are provided. This allows the other classes to set and query this property of interest.

Figure 11:
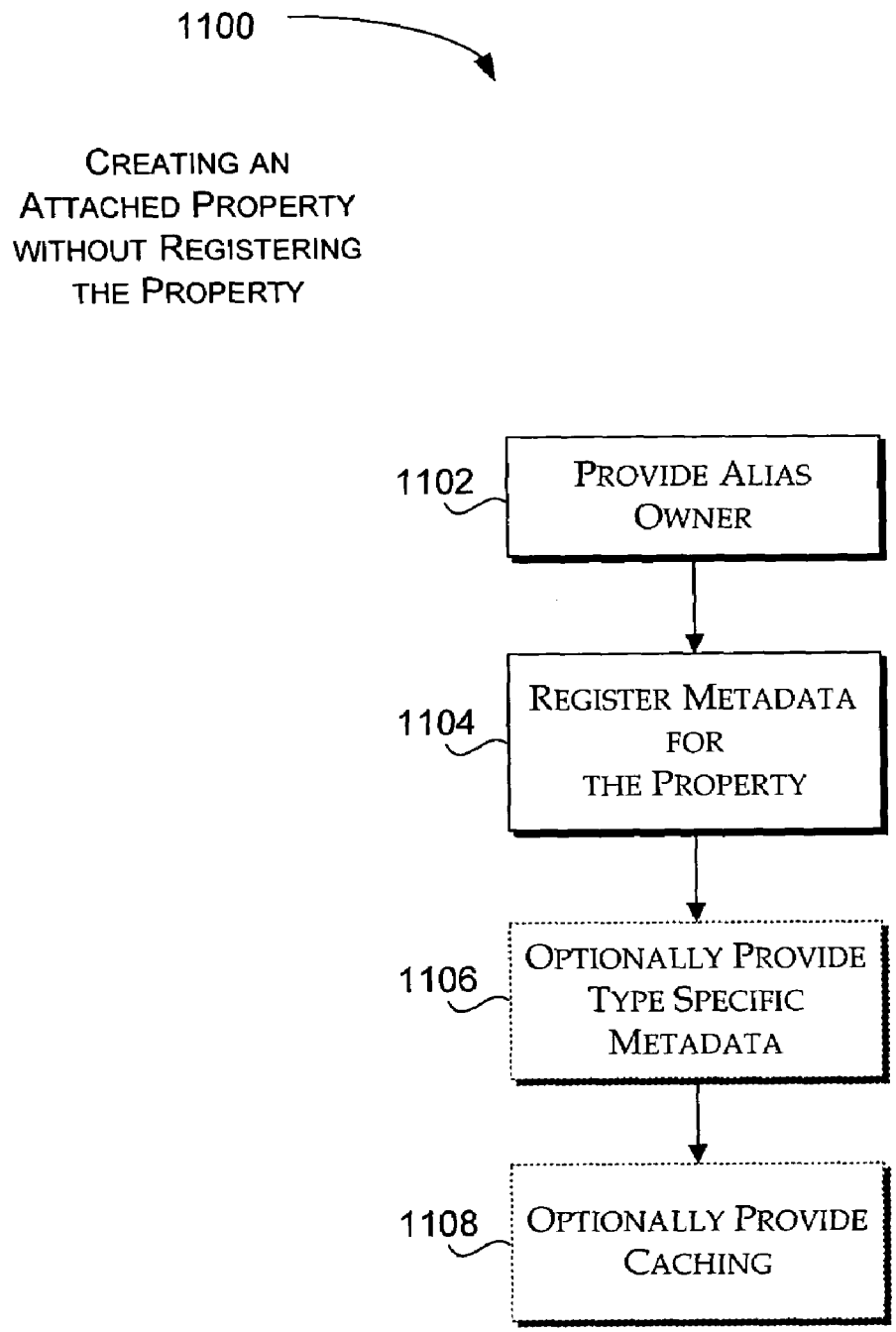
FIG. 11 is a process for attaching a property without registering the attached property.

FIG. 11 is a process for creating an attached property without registering the property of interest. This allows the parser to discover the property of interest on the specified owner type. At block 1102, an alias owner is provided. The alias owner is added to a list and is associated with the property of interest. This allows the parser to discover the property of interest on the specified type. At block 1104, metadata associated with the property of interest is registered using one of the APIs discussed above. At block 1106, type specific metadata may be provided. However, care must be taken not to add metadata that is not appropriate for all types.

FIG. 12 is provided as an illustrative embodiment 1200 for implementing a portion of the present property management mechanisms.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer storage medium having computer executable instructions embodied thereon that, when executed by a computing device, provide one or more Application Programming Interface (API) methods, the Application Programming Interface methods comprising:

providing, by one or more APIs, a property management mechanism for associating on demand a dependency property with at least one object and for specifying metadata for the dependency property;

providing, by the one or more APIs, functionality configured to access, validate or update the dependency property and an associated value of the dependency property only when the dependency property is queried;

providing, by the one or more APIs, functionality that handles invalidation notifications for the dependency property; and defining, by the one or more APIs, behavior associated with the dependency property, wherein the dependency property is a defined type and is associated with a plurality of objects, wherein accessing or changing a value of the dependency property by one or more members of the plurality of objects, as the value of the dependency property relates to that one or more members of the plurality of objects, without affecting the value of the dependency property as the value of the dependency property relates to other members of the plurality of objects, and wherein an indication of validity of the value of the dependency property is referenced such that:

responsive to the indication of validity indicating a dirty value, overriding the value of the dependency property, and responsive to the indication of validity not indicating a dirty value, not overriding the value of the dependency property, wherein overriding the value of the dependency property comprises determining the value of the dependency property at least partially responsive to metadata associated with the dependency property, via looking up in a hierarchy.

2. The computer storage medium of claim 1, the method further comprising providing an expression for associating a value of the dependency property to an instance of the object, the expression defining a relationship among dependency properties.

3. The computer storage medium of claim 2, wherein the expression defines logic for computing the value for the dependency property.

4. The computer storage medium of claim 3, wherein the logic depends on a target outside the knowledge of the on-demand property system.

5. The computer storage medium of claim 4, the method further comprising informing the on-demand property system of the dependency of the target in relation to the dependency property.

6. A software system implemented at least in part by a computing device, the software system comprising:
an object that sub-classes functionality provided by an on-demand property engine, using one or more Application Programming Interfaces (APIs), the functionality providing a dependency mechanism to attach a dependency property to the object on demand using the one or more APIs, without having the dependency property consume memory within the object, the on-demand property engine providing a cache for storing a value and an identifier associated with the dependency property and a mechanism for obtaining the value associated with the dependency property on demand, the mechanism configured to access, validate or update the dependency property and an associated value of the dependency property only upon receiving a query for the dependency property, wherein the dependency property is associated with a plurality of objects, wherein accessing or changing the value of the dependency property by one or more members of the plurality of objects, as the value of the dependency property relates to that one or more members of the plurality of objects, without affecting the value of the dependency property as the value of the dependency property relates to other members of the plurality of objects,
and wherein an indication of validity of the value of the dependency property is referenced such that:
responsive to the indication of validity indicating a dirty value, overriding the value of the dependency property, and responsive to the indication of validity not indicating a dirty value, not overriding the value of the dependency property, wherein overriding the value of the dependency property comprises determining the value of the dependency property at least partially responsive to metadata associated with the dependency property, via looking up in a hierarchy.

7. The software system of claim 6, wherein the functionality includes an invalidation callback configured to be called when a source for the dependency property undergoes a change, the invalidation callback notifies the on-demand property system of the change.

8. The software system of claim 6, wherein the dependency mechanism includes a registration function that identifies a property type and a name, wherein the name identifies the dependency property and the property type identifies a data type for the dependency property.

9. The software system of claim 6, wherein the dependency mechanism further includes an owner type that identifies a type for the object which associated the dependency property with the object.

10. The software system of claim 6, wherein the dependency mechanism includes a registration function that registers a property as an available dependency property, the registration function accepts metadata that provides general operating characteristics for the dependency property.

11. The software system of claim 6, wherein the dependency mechanism includes an add owner method that attaches the dependency property to a data type of an additional owner.

12. The software system of claim 6, wherein the dependency mechanism includes an over-ride metadata function that allows metadata to be overridden with type metadata, the type metadata being specific to the data type of the object on which the dependency property is set.

13. The software system of claim 6, wherein the dependency mechanism comprises an array of dependency sources, each dependency source representing a source for the dependency property, the dependency source affecting the determination of the value for the dependency property.

14. The software system of claim 13, wherein the dependency source properties receive a back pointer to invalidate the dependency property.

15. The software system of claim 6, wherein the dependency mechanism includes an invalidation method that is called when the dependency property on which an expression is applied becomes invalidated, the expression configured to associate a value of the dependency property to an instance of the object, the expression defining a relationship among dependency properties.

16. The software system of claim 6, wherein obtaining the value for the dependency property comprises a read local value function that reads a local value for the dependency property.

17. The software system of claim 6, wherein obtaining the value for the dependency property comprises obtaining a default value for the dependency property.

18. The software system of claim 6, wherein obtaining the value for the dependency property comprises computing a new value for the dependency property.

19. A computer storage medium having computer executable instructions embodied thereon that, when executed by a computing device, provide a function for registering on demand, by one or more Application Programming Interfaces (APIs), a property as a dependency property, the function configured to associate the dependency property with an object using the one or more APIs, the function further configured to access, validate or update the dependency property and an associated value of the dependency property only when the dependency property is queried, wherein the dependency property is associated with a plurality of objects, wherein accessing or changing a value of the dependency property by one or more members of the plurality of objects, as the value of the dependency property relates to that one or more members of the plurality of objects, without affecting the value of the dependency property as the value of the dependency property relates to other members of the plurality of objects,
and wherein an indication of validity of the value of the dependency property is referenced such that:
responsive to the indication of validity indicating a dirty value, overriding the value of the dependency property, and responsive to the indication of validity not indicating a dirty value, not overriding the value of the dependency property, wherein overriding the value of the dependency property comprises determining the value of the dependency property at least partially responsive to metadata associated with the dependency property, via looking up in a hierarchy.

20. The computer storage medium of claim 19, wherein the function further accepts an expression that specifies a mechanism for obtaining a value for the dependency property.

* * * * *